United States Patent [19]
Swartz et al.

[11] 3,720,457
[45] March 13, 1973

[54] SYSTEM FOR POLARIZING OPTICAL ENERGY AND TRANSMITTING THE SAME THROUGH MEDIA

[75] Inventors: Jerome Swartz, Stoneybrook, N.Y.; Donald K. Wilson, West Caldwell, N.J.

[73] Assignee: Special Optics Inc., Cedar Grove, N.J.

[22] Filed: Nov. 18, 1970

[21] Appl. No.: 90,656

[52] U.S. Cl. .................. 350/157, 350/147, 350/152, 350/286
[51] Int. Cl. ............................................. G02b 5/30
[58] Field of Search ...... 350/147, 152, 157, 166, 169, 350/171, 286

[56] References Cited

UNITED STATES PATENTS

| | | | |
|---|---|---|---|
| 2,942,538 | 6/1960 | Bechtold | 350/286 |
| 3,001,015 | 9/1961 | Weiss | 350/152 X |
| 3,552,823 | 1/1971 | Badoz et al. | 350/157 |

OTHER PUBLICATIONS

Shultz, "A Low Loss Polarizing Prism" App. Opt. Vol. 8, No. 5 (May, 1969) p. 1068
Ammann et al., "Modified Forms for Glan-Thompson and Rochon Prisms" J.O.S.A. Vol. 58, No. 11 (Nov. 1968) pp. 1427-1433
Shurcliff, "Polarized Light" (Harvard Univ. Press Cambridge, Mass. 1962) pp. 74-76 relied on.

*Primary Examiner*—David Schonberg
*Assistant Examiner*—Paul R. Miller
*Attorney*—Kirschstein, Kirschstein, Ottinger & Frank

[57] ABSTRACT

The essence of the invention resides in a unique prism arrangement for polarizing a limited angular apertured beam and the minimum reflection loss transmission of the extraordinary ray of the beam through isotropic and/or anisotropic media. In a first stage uniaxial medium the extraordinary ray is transmitted therethrough when the angular apertured beam strikes the entrance boundary at the Brewster angle with the optic axis of the uniaxial medium parallel to that boundary surface and the ordinary ray is totally reflected at the exit boundary and a polarized parallel beam is obtained with the utilization of a second stage of isotropic or anisotropic material wherein the gap between the first and second stages may be uniform or tilted.

40 Claims, 7 Drawing Figures

INVENTORS
JEROME SWARTZ
DONALD K. WILSON

BY

ATTORNEYS

INVENTORS
JEROME SWARTZ
DONALD K. WILSON

BY

ATTORNEYS

SYSTEM FOR POLARIZING OPTICAL ENERGY AND TRANSMITTING THE SAME THROUGH MEDIA

BACKGROUND OF THE INVENTION

1. Field of the Invention

The invention relates to a transmission of a ray of light through an anisotropic medium at the Brewster angle.

2. Description of the Prior Art

Heretofore, it has been known that the transmission of light rays through isotropic media is possible with relatively low reflection losses. Research has been conducted, and its use in industry applied, wherein light was transmitted at the Brewster angle through prisms of isotropic media. The transmission through an isotropic medium has been accomplished using a Glan-Foucault prism.

The Taylor modification of the Glan-Foucault prism arrangement permitted the extension of the transmission of light through an isotropic medium at even lower reflection losses. Prior art prism systems, such as Glan-Thompson arrangement, use cement such as Canada balsam which did not transmit the ultraviolet range of light energy. Thus, for ultraviolet polarimetry it was necessary to employ an air film prism, which is good through the visible range (near infra-red), so that a broad spectral response could be obtained. For polarimetric work in the ultraviolet range, it is impossible for most polarizing prisms, of the cemented type, to obtain minimum reflection losses in the Canadian balsam film. In the Glan-Foucault modification, these defects are somewhat remedied but other difficulties arise in reflections at the boundaries. These reflections reduce the transmission efficiency of the prisms, as a whole, and when the prisms are used in non-parallel light they give rise to secondary images, and further reduce the non-loss transmission.

Thus for a normal double Glan-Foucault prism arrangement, reflection losses for the transmitted extraordinary ray are rather large due to the additional air-calcite interfaces. For example, $K_1$ ($e$-ray transmission) was approximately 0.54. Archard and Taylor, in 1948, modified the optic axis orientation in order to increase the $e$-ray transmission ($K_1$) to about 0.86.

In the Taylor modification, the angular aperture of the prism is reduced by less than one percent by the change in the orientation of the optic axis.

Further, prior art extinction ratios ($K_1/K_2$) were low where $K_2 = o$-ray out/$o$-ray in for the ordinary ray, which follows because of the low transmission percentage of the extraordinary ray. The low extinction ratio further complicated the transmission of the extraordinary ray through the air gap by forming secondary images.

SUMMARY OF THE INVENTION

The objects of the present invention, and other objects, which will become apparent as the description proceeds, are achieved by providing an anisotropic medium capable of transmitting polarized light therethrough at Brewster angle with respect to the extraordinary ray at a minimum reflective loss, while rejecting the ordinary ray.

Another object of the present invention is to design an anisotropic medium for the transmission of the extraordinary ray at the equivalent Brewster angle for no loss transmission through an isotropic medium.

A further object of the present invention is to substantially increase the transmission of polarized light over the previous designs by modifying the optic axis or angular orientation of the single ended Taylor Glan-Foucault prism so that reflective losses are reduced to an absolute minimum.

Yet further object of the present invention is to transmit polarized light through an anisotropic boundary by choosing an axis such that we truly obtain zero reflection at the exact anisotropic Brewster angle.

Still another object of the present invention is to provide a design for matching glass pieces for one end of a prism arrangement to drastically reduce the expense of calcite prisms costs without a serious deterioration of the output properties of a polarized light transmitted therethrough.

Yet another object of the present invention achieves a polarized light which is parallel to the input optical energy to a prism arrangement.

Yet a further object of the present invention is to provide a prism arrangement for obtaining and transmitting polarized light for use in conjunction with high-powered lasers.

Another object of the present invention is to provide a tilted air gap between prisms to further reduce losses or eliminate beam deviation.

Still another object of the present invention is to provide a tiltable air gap between stages of a prism arrangement such that the gap may be varied to reduce reflection losses in transmitting polarized light.

A further object of the present invention is the ability to utilize the tilted air gap to be used as a correction factor between the prisms.

Another object of the present invention is to provide a tiltable air gap between two prisms to allow the use of inexpensive high quality types of glass.

Yet a further object of the present invention is to achieve a large aperture for double ended calcite designs using relatively inexpensive glass prisms.

The objects of the present invention, and other objects will become apparent as the description proceeds, are achieved by providing a system for polarizing optical energy and transmitting the same through media comprising a uniaxial medium having an entrance boundary and an exit boundary, a limited angular aperture arbitrarily polarized beam having a principal ray as a component thereof, said principal ray being comprised of an ordinary and an extraordinary ray, and an isotropic medium surrounding said uniaxial medium, said principal ray directed to impinge upon said entrance boundary, said extraordinary ray thus being transmitted through said uniaxial medium and emerging from said exit boundary with minimum reflection loss, the transmission of said extraordinary ray occurs through one of said boundaries at the Brewster angle for said extraordinary ray and associated uniaxial medium and surrounding isotropic medium.

BRIEF DESCRIPTION OF THE DRAWINGS

For a better understanding of the present invention, reference should be had to the accompanying drawings wherein like numerals of reference indicate similar parts throughout the respective views and wherein.

DESCRIPTION OF PREFERRED EMBODIMENTS

Figure 1:
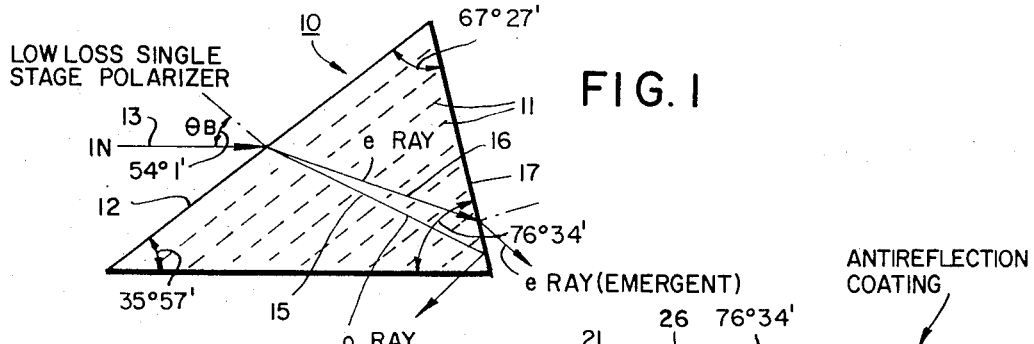
FIG. 1 is a schematic representation of a single-stage prism showing the entrance of optical energy at an angle with respect to the normal to the entrance boundary.

In order to more fully appreciate the essence of the invention, which will hereinafter by described, it may be necessary to review certain features of prior art devices, such as Glan-Foucault polarizing prisms and their reactions to an impinging ray of light. Further, the Taylor modification of the Glan-Foucault prisms are of interest.

The prior art has provided a polarizing prism of the Glan-Foucault class comprising two calcite prisms separated by a uniform gap. The calcite material, which is birefringent, in that the index of refraction presented to incident light waves depends upon the plane of polarization of the waves. Unpolarized energy incident upon such materials is split into two component portions one of which follows the usual Snell's law and is termed the ordinary ray or $o$-ray, the other of which does not follow the usual Snell's law and is termed the extraordinary ray or $e$-ray, in that the $e$-ray and its wave normal no longer coincide as for the $o$-ray, in the uniaxial medium.

Calcite, an expensive material, is classified as a uniaxial medium since there is a certain specific direction associated with it which is termed the optical axis. This direction or optic axis is dintinguished from all other directions by the fact that when a beam of light traverses the calcite along the optic axis the two rays, $o$ and $e$, processed with equal velocity along the same path and are not distinguished one from the other. Thus, a beam of light having a principal ray traversing a uniaxial medium along the optic axis has the components of the principal ray travel the same path, i.e., they are not divergent. At this juncture where $c/n_o$ (where $c$ in a vacuum is the velocity of light) equals the velocity of the ordinary ray, the following holds true:

$$n = n_o$$

A beam of light traversing the uniaxial medium in any other direction other than parallel to the optic axis, is characterized by the two rays propagating with unequal velocities. Since the $o$ and $e$ rays travel with unequal velocities the index of reflection associated with the material comprising the prism (calcite) is different for the two ray components. From a consideration of Snell's law for waves travelling from an optically denser medium ($n_1$) into an optically rarer medium ($n_2$), the total reflection cannot take place for all angles of incidence. In the case of birefringent materials, therefore, there is a range of angles of incidence for principal rays at which one of the ray components will be totally reflected ($o$-ray) and one will be refracted ($e$-ray). Since the ray components are orthogonally polarized, the effect of passing an unpolarized light beam through a prism at an angle of incidence at a gap within the proper range is to split the beam into a transmitted component of polarized light parallel to the plane of the optic axis ($e$-ray) and a reflected component normal to it ($o$-ray).

In the Taylor modification of the Glan-Foucault class, a polarizing system may be provided with a pair of right triangular prisms which are separated by a uniform gap. One prism may be comprised of a birefringent material such as calcite with an optical axis direction as may be predetermined thus where as the optic axis direction of one prism is parallel to the plane of the prism face at which a beam of light enters. As previously indicated a beam of any unpolarized light incident upon an external anisotropic prism face at an angle with respect to the optic axis splits into two components ($o$ and $e$ rays), the extraordinary ray with a polarization in the plane of the optic axis, and the other component of the principal ray, the ordinary ray, with a polarization normal to the optic axis and normal to that of the extraordinary ray. These rays in a uniaxial medium propagate along the same path with unequal velocities. Thus, the ordinary ray, under certain conditions will be totally reflected from the boundary between the prisms, while the extraordinary ray will be refracted at the gap and transmitted to the contiguous prism.

We have determined that the specific cut of a calcite or uniaxial medium prism, in a predetermined manner, will assure certain positive results. As shown in FIG. 1, for example, a uniaxial medium may be cut wherein the optic axis of the prism is parallel to the entrance boundary so that the input beam enters at Brewster's angle for the $e$-ray and associated uniaxial and surrounding media where the $e$-ray of the principal ray of the output beam is laterally deviated and angularly divergent with respect to the principal ray of an input beam. The ordinary ray may be totally reflected at an exit boundary. Another form of transmission is to provide the optic axis of the uniaxial medium parallel to the exit boundary such that the $e$-ray will exit at Brewster's angle and be divergent from the $o$-ray. In the latter case, the $e$ and $o$-rays can exit undeviated but angularly divergent from the entrance boundary input, and a glass wedge can be added at the exit boundary to reject the $o$-ray.

We have found that the cutting of the uniaxial medium, that is with respect to the optic axis, and the prism angle at the true uniaxial medium's Brewster angle will result in the desired minimum reflection loss transmission and polarization of a principal ray. The no reflection or matching condition for the optic axis parallel to the entrance boundary interface occurs at $$\theta_B = \mathrm{Sin}^{-1} \sqrt{\frac{n_o^2(n_e^2 - 1)}{n_e^2 n_o^2 - 1}}$$

where $\theta_B$ is Brewster's angle for an anisotropic medium and is the input beam's angle with respect to the normal to the uniaxial medium input or entrance boundary. The above equation is for air and any uniaxial medium and wave length $\lambda$, where the unity factor can be replaced by an appropriate $n_s$ factor, where $n_s$ is the refractive index of an arbitrary isotropic surrounding medium. We have noted that in the case of an isotropic medium $$\text{Tan } \theta_B = n > 1$$

so that $\theta_b$ must exceed 45° whereas for an anisotropic medium $\theta_B$ may be less than 45°. This discussion will become more meaningful as the description of the invention proceeds.

As previously indicated, a limited angular aperture arbitrarily polarized beam of light traversing the crystal in any direction other than parallel to the optic axis is characterized by two rays propagating with unequal velocities. As shown in FIG. 1, a prism 10 is provided with an optic axis of a uniaxial medium as indicated by the dashed lines 11 which in this case is parallel to the entrance boundary 12 of the prism 10. A limited angular aperture arbitrarily polarized beam 13 is directed at the entrance boundary 12 at an angle $\theta_B$ with respect to the normal of the entrance boundary of the uniaxial medium, the ordinary ray 15 and extraordinary ray 16 travelling through the prism with different velocities. The e-ray 16 is incident upon the exit boundary 17 of the prism 10 at an angle, the magnitude of which is of critical importance. Since the e-ray 16 and the o-ray 15 components of the principal ray 13 travel with unequal velocities, the index of refraction associated with the material comprising the prism (in this case anisotropic) is different for the two ray components. From a consideration of Snell's law for waves travelling from an optically denser medium into an optically rarer one, refraction cannot take place for all angles of incidence at the exit boundary.

In the case of uniaxial medium 10, therefore, there is a range of angles of incidence for a principal ray 13 for which one of the ray components will be totally reflected and one will be transmitted. The angle at which the e-ray will be transmitted through the first-stage prism surface at no reflection loss is $\theta_B$ which is Brewster's angle for e-ray transmission.

The total reflection of the o-ray, as shown in FIG. 1, occurs at the exit boundary 17 of the prism 10 and is termed the "critical angle of reflection." Since the principal ray components become polarized, the effect of passing an unpolarized light beam 13 through a prism 10 at an angle of incidence at the entrance boundary of the prism 10 within a proper angle of incidence range is that one component of the beam is transmitted as a polarized component in the plane of the optic axis and the other component of the principal ray may be totally reflected.

In the embodiment shown in FIG. 1, the principal ray 13 impinges upon said entrance boundary 12 at an angle $\theta_B$ with respect to the normal of the optic axis, said angle $\theta_B$ being termed Brewster's angle. As previously indicated where $\theta_B$ (anisotropic) is the input beam's angle with respect to the normal to the calcite entrance boundary 12, in the isotropic case $\text{Tan } \theta_b = n > 1$ so that $\theta_B$ must exceed 45°, whereas for an anisotropic medium $\theta_B$ may be less than 45°. Thus for air and calcite at $\lambda = 6328\text{A}$ we have determined that:

$$\theta_B = 54° 1'$$

As shown in FIG. 1, the limited angular aperture arbitrarily polarized beam 13 enters the prism 10 from the left to the right, horizontally at Brewster's angle, and when the apex of the prism is cut in such a manner as to provide an angle of 67° 27' the e-ray 16 will pass through the prism 10 and through the rear exit boundary 17 of said prism 10 with minimum reflection loss and the o-ray 15 will pass through the prism 10 and strike the exit boundary 17 at the critical angle of reflection. In essence, the extraordinary ray passes through the uniaxial medium (anisotripic) and exits at the rear surface.

Figure 2:
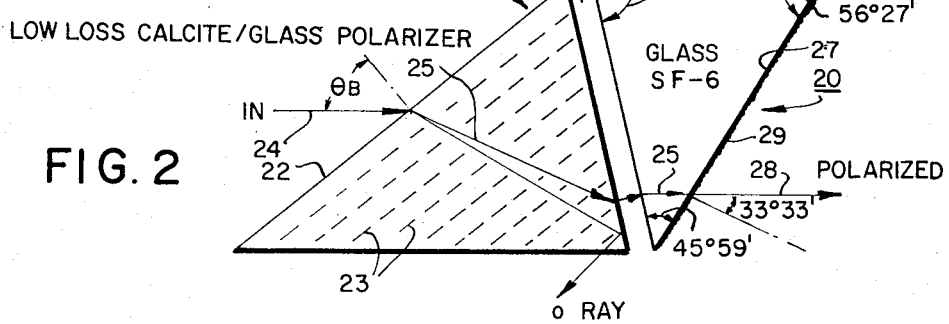
FIG. 2 is a schematic representation of a two-stage prism system showing the entrance of a light beam and the emergence therefrom.

As shown in FIG. 2, a second stage or prism 20 is disposed adjacent a first uniaxial medium prism 21, previously discussed in detail. It should be noted in this two-stage prism arrangement of FIG. 2 that the entrance boundary 22 of the first prism 21 is parallel to the optic axis 23. A limited angular aperture arbitrarily polarized beam 24 having a principal ray impinges on the entrance boundary 23 at the Brewster angle for the extraordinary ray 25. The second stage 21 is composed of anisotropic medium such as glass which contains no fixed optic axis for the polarized e-ray 25. The air gap 26 disposed between the first stage 21 and second stage 20 is of uniform spacing and is positioned in such a manner as to permit the e-ray 25 entering the entrance boundary 22 of the first stage 21 to emerge from the second stage 21 at the exit surface 27 thereof at the same angle as that of the input ray to the entrance boundary.

The output or second stage glass half 20 is chosen for Brewster angle complete transmission across the air gap 26 and to yield an output polarized beam 28 at the exit surface 27, parallel to the input beam 24 entering the entrance boundary 22. Reflection losses at the exit surface 27 must be eliminated by a proper anti-reflection oblique angle coating 29 at the operational wave lengths. The anti-reflection coating 29 is selected for the appropriate wave length of interest of the limited angular aperture arbitrarily polarized beam and for the angle of that beam with respect to the surface it is in relation to, as well as the index of refraction. In this instance, shown in FIG. 2, we deal with a polarized beam 28 and this must be considered when selecting such anti-reflection coating. In this case magnesium fluoride is used. Glass, used for the second stage, may be of the SF6 or SF18 type which are relatively cheap, available Schott glasses with low dispersion and low bubble qualities.

Figure 7:
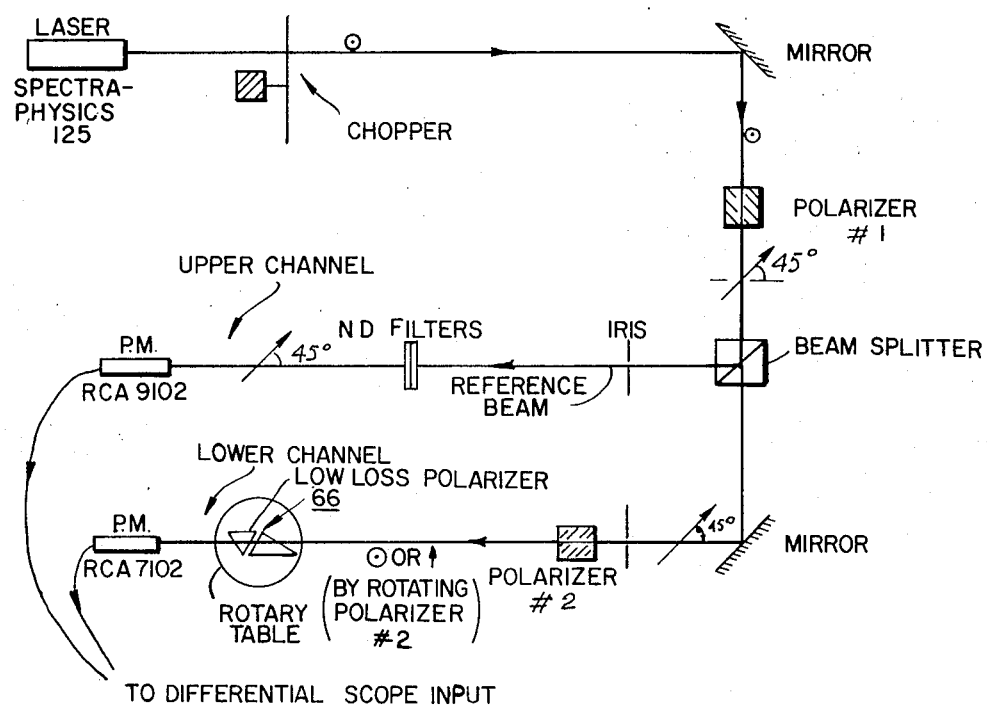
FIG. 7 is a schematic representation of a test set-up in which experimental measurements are obtained on extraordinary ray transmission and ordinary ray rejection.

The top or bottom surface of the second stage 20 may be used for alignment of a laser beam (not shown) and the entire prism may be rotated for maximum transmission or minimum reflection alignment with respect to the laser beam (See FIG. 7).

An alternative parallel output configuration may be based upon the same design concepts as shown in FIG. 2 but utilizing uniaxial media for the first stage 30 and the second stage 31. Again, the apex angle of the calcite second stage is in the range from 67° 27' to 66° 55'. Although we have disclosed a rather narrow range of angles for the apex of the calcite first-and/or second-stage prisms we have determined that the apex angle may be varied over a greater range so that larger apex angles may allow o-ray rejection but a reduced $K_1$ for the e-ray. Similarly, the apex angle of the calcite stage may be varied from the range indicated and such variance may enhance the e-ray transmission but inhibit o-ray rejection.

Figure 3:
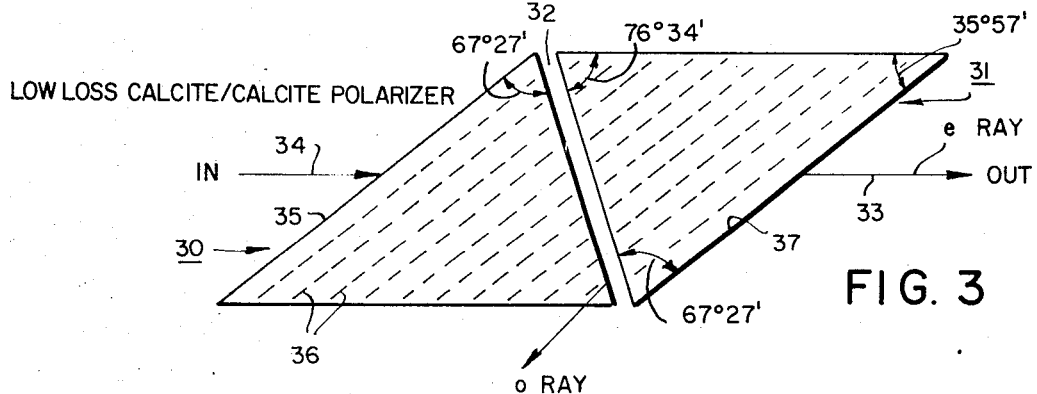
FIG. 3 is a schematic representation of a two-stage prism system having two uniaxial media.

As shown in FIG. 3, a calcite-calcite prism arrangement is provided wherein the second stage 31 is an inverted first stage 30 used in tandem with an identical calcite first stage 30 and uniform air gap 32 to provide a collimated undeviated output with minimum air gap reflection losses. However, this arrangement is quite expensive. The arrangement shown in FIG. 3 results in an output polarized beam 33, which is parallel to the input limited angular aperture arbitrarily polarized beam 34. In this manner, we may obtain an undeviated undisplaced polarized beam having a high efficiency transmission between the first and second calcite stages of the prism arrangement.

As shown in FIG. 3, Brewster's angle input at the entrance boundary 35 of the first stage 30 having its optic axis 36 parallel to the entrance boundary 35 will provide a polarized e-ray output 33 at the exit surface 37 of said second stage 31, also at Brewster's angle with respect to the exit surface 37.

Figure 5:
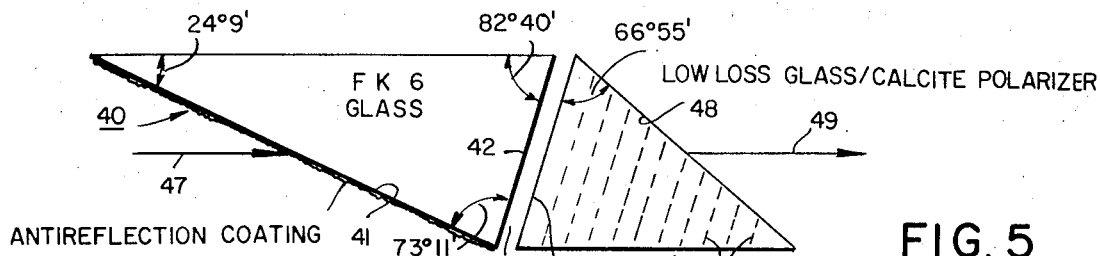
FIG. 5 is a schematic representation of a two-stage prism system using an anisotropic and an isotropic medium.

As shown in FIG. 5, yet another less expensive configuration is provided using isotropic media and anisotropic media to permit the transmission of polarized light at minimum reflection losses. In this case, a first-stage glass prism 40 of FK6 having an entrance boundary 41 and an exit boundary 42 is provided. The prism is cut to provide an optimum wedge angle of 24° 9'. A second prism or stage 43 of uniaxial material, such as calcite, is spaced a uniform distance from the exit boundary 42 of the first stage 40. The calcite second stage or prism is provided with an apex angle of 66° 55' to 67° 27', for example. The uniaxial prism 43 has its optic axis 44 running parallel to the entrance surface 45 thereon which is parallel to the uniform air gap 46. A limited angular arbitrarily polarized beam 47 enters the glass stage at the entrance boundary 41 which is quarter wave coated to match indices at 6328A. At the entrance surface 45 of the second stage the refracted unpolarized beam emerging from the glass stage impinges upon the entrance surface 45 at Brewster's angle, since the glass first stage 40 is oriented to deflect the beam 47 so that the impinging beam upon the entrance surface 45 of the calcite prism is at an angle with respect to the normal to said entrance surface which is equivalent to the Brewster angle. Through calculation, it has been determined that the FK6 glass deviates by less than 2° below the perfect glass matching condition so that losses therethrough are low at the air gap 46. The calcite stage 43 allows the e-ray transmission and the o-ray rejection at the exit surface 48, as previously discussed in relation to FIG. 1. It should be noted that the purpose of the glass stage is to provide beam collimation. It should be noted that the output polarized beam 49 emerging from the exit surface 48 of the second stage 43 is parallel to the limited angular apertured arbitrarily polarized beam 47 impinging upon the entrance boundary 41 of the glass prism 43.

Figure 4:
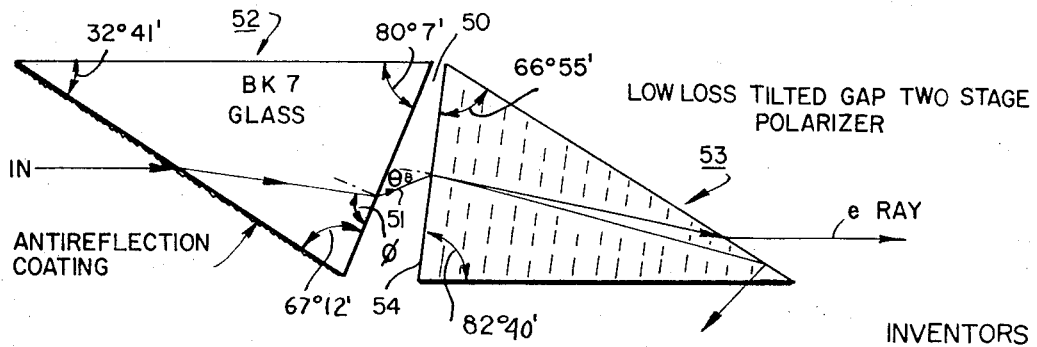
FIG. 4 is a schematic representation of a double-ended prism system using a tilted air gap between isotropic and anisotropic media.

In order to obtain the proper Brewster angle condition in the glass and allow the utilization of the cheapest most available and best propertied laser glass, the air gap shown in FIG. 4 between the isotropic and anisotropic medium may be tilted. A tilted air gap, as discussed above, may be used in connection with the embodiment shown in FIG. 2, for the exact same purpose hereinabove enumerated. The tilting of the air gap 50 provides a flexible means of deviating the beam 51 emerging from the first-stage glass prism 52 to effect the obtaining of the proper Brewster angle across the air gap 50 in the glass and calcite so that the beam 51 may impinge upon the entrance surface 54 of the uniaxial medium second-stage prism 53. As shown in FIG. 4, the use of the tilted air gap 50 may be used to limit reflection losses at the gap completely and allow the use of matching Brewster angle glass which requires relatively little product modification. The calcite or uniaxial second stage 53 may be designed to permit the total reflection at the exit surface of the o-ray and may be used in tandem with an identical reversed calcite front end (not shown) and a uniform gap to provide a collimated undeviated minimum air gap reflection loss.

Figure 6:
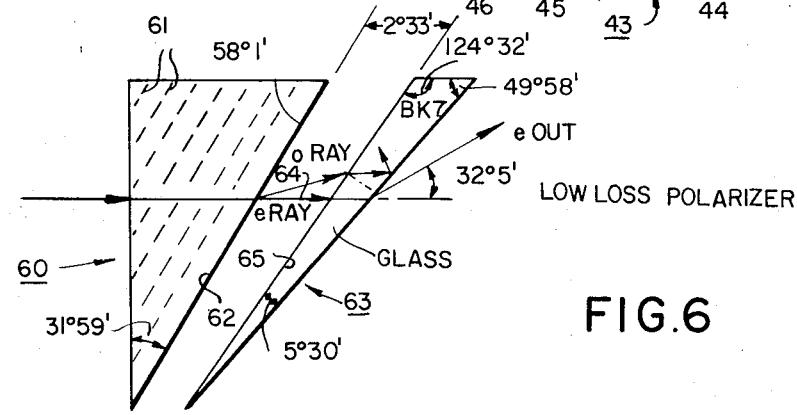
FIG. 6 is a schematic representation of a two-stage prism system having a tilted air gap.

A very efficient design with regard to the transmission of the extraordinary ray may be seen in FIG. 6. A uniaxial medium first stage 60 is provided with its optic axis 61 parallel to the exit boundary 62 and a second stage 63 or wedge of glass of FK6 material permits the non-loss transmission of the polarized e-ray 64. The drawback of such design is that it is an inherently "non-parallel type output" which displays divergence as well as deviation. The input right angle calcite prism first stage 60 is cut with the optic axis parallel to the exit boundary 62 and can be readily quarter wave, single layer, hard coated for normal incidence of the e-ray at the operating wave lengths. The tilted interface surfaces provide Brewster's angle for the e-ray 64 at both the calcite exit boundary 62 and glass prism entrance surface 65 and the o-ray is rejected at the coated exit surface 66 of the glass wedge 63. This latter condition theoretically prevents desirable parallel out properties for the e-ray. Again, the tilted air gap condition allows a lossless air gap for the glass. Moreover, the calcite front end is by itself a particularly useful wide angle high efficiency laser polarization splitter of the e- and o-rays.

FIG. 7 depicts a high accuracy insertion loss or nulling technique-experimental setup required to perform measurements on the high efficiency laser polarizer of the instant invention. Since e-ray transmission and o-ray rejection are so high, normal electronic means for absolute measurement of the quantities is insufficiently accurate and, therefore, a differential measurement is preferred, the same utilizing two optically balanced channels (upper and lower, as shown) and a differential amplifier of a Tektronix oscilloscope. Tests were performed as shown on the calcite/glass design of FIG. 2 at 66°55' apex angle and wave lengths of 6328 A uncoated.

To measure e-ray transmission efficiency, we remove the low loss polarizer 66 of the present invention from the lower channel and balance the upper channel by inserting an appropriate neutral density filter ND in the reference beam. With the polarizer 66 replaced, we then adjust for appropriate Brewster angle at the entrance surface of the calcite by looking for extinction of the reflected beam. Insertion of the polarizer 66 then yields less than a three (3 percent) percent loss, so that $K_1 = 97-98$ percent. To measure the rejection ratio or $o$-ray extinction, we again balance the two channels, insert the polarizer 66 and insert a No. 3 neutral density filter in the reference beam. We observed an estimated ratio of $$K_1/K_2 = 10^4 - 10^5$$

Such measurements are an experimental corroboration of the extremely high efficiency and rejection values of a polarizer embodying the present invention.

Thus, it will be seen that there are provided systems for transmitting optical energy and polarizing the same through media which achieve the several objects of the invention and which are well adapted to meet the conditions of practical use.

As various other possible embodiments might be made of the above invention and as various changes might be made in the embodiments set forth, it is to be understood that all matter herein described or shown in the accompanying drawings is to be interpreted as illustrative and not in a limiting sense.

We claim:

1. A system for polarizing optical energy and transmitting the same through media comprising a uniaxial medium having an entrance boundary and an exit boundary, a limited angular aperture arbitrarily polarized beam having a principal ray as a component thereof, said principal ray being comprised of an ordinary and an extraordinary ray, and an isotropic medium surrounding said uniaxial medium, said principal ray directed to impinge upon said entrance boundary, said extraordinary ray thus being transmitted through said uniaxial medium and emerging from said exit boundary with minimum reflection loss, the transmission of said extraordinary ray occurring through one of said boundaries at the angle which is angle yielding a complete transmission condition for said extraordinary ray and associated uniaxial medium and surrounding isotropic medium.

2. A system for polarizing optical energy and transmitting the same through media according to claim 1 wherein one of said boundary of said uniaxial medium is parallel to the optic axis of said uniaxial medium so that complete transmission condition for said extraordinary ray yields an angle of incidence from isotropic to uniaxial mediums given by equation:

$$\theta_B = \mathrm{Sin}^{-1}\sqrt{\frac{n_o^2(n_e^2-1)}{n_e^2 n_o^2 - 1}}$$

where $n_o$ is the ordinary index and $n_e$ is the extraordinary index of said uniaxial medium and said isotropic surrounding media is air.

3. A system for polarizing optical energy and transmitting the same through media according to claim 2 wherein said optic axis is parallel to said entrance boundary.

4. A system for polarizing optical energy and transmitting the same through media according to claim 3 wherein said ordinary ray is angularly divergent from said extraordinary ray and is reflected at said exit boundary.

5. A system for polarizing optical energy and transmitting the same through media according to claim 4 wherein said exit boundary is cut to form the critical angle of reflection with respect to said ordinary ray of said uniaxial medium such that said ordinary ray is totally reflected at said exit boundary.

6. A system for polarizing optical energy and transmitting the same through media according to claim 5 wherein said uniaxial medium is calcite and said isotropic surrounding medium is air.

7. A system for polarizing optical energy and transmitting the same through media according to claim 6 wherein said uniaxial medium is in the form of a prism having an apex angle cut to achieve maximum or optimum transmission of the extraordinary ray and total or optimum reflection of the ordinary ray.

8. A system for polarizing optical energy and transmitting the same through media according to claim 7 wherein said uniaxial medium is in the form of a prism having an apex angle in the range of 67°27' to 66°55'.

9. A system for polarizing optical energy and transmitting the same through media according to claim 5 wherein the exit boundary is antireflection coated for said extraordinary ray transmitted through said exit boundary.

10. A system for polarizing optical energy and transmitting the same through media according to claim 5 wherein said uniaxial medium is provided with a third boundary which is parallel to said limited angular aperture arbitrarily polarized beam.

11. A system for polarizing optical energy and transmitting the same through media according to claim 5 wherein said transmitted extraordinary ray emerges from said exit boundary non-parallel with respect to said limited angular aperture arbitrarily polarized beam impinging said entrance boundary of said uniaxial medium.

12. A system for polarizing optical energy and transmitting the same through media according to claim 2 wherein said optic axis of said uniaxial medium is parallel to said exit boundary such that said extraordinary ray emerges from said exit boundary at Brewster's angle for the extraordinary ray and associated uniaxial medium and isotropic surrounding medium.

13. A system for polarizing optical energy and transmitting the same through media according to claim 12 wherein said uniaxial medium is calcite and said isotropic surrounding medium is air.

14. A system for polarizing optical energy and transmitting the same through media according to claim 13 wherein said uniaxial medium is in the form of a prism having an apex angle cut to achieve maximum or optimum transmission of the extraordinary ray and total or optimum reflection of the ordinary ray.

15. A system for polarizing optical energy and transmitting the same through media according to claim 14 wherein said uniaxial medium is in the form of a prism having an apex angle in the range of 67° 27' to 66° 55'.

16. A system for polarizing optical energy and transmitting the same through media according to claim 5 wherein said entrance boundary is anti-reflection coated for said extraordinary ray transmitted through said entrance boundary.

17. A system for polarizing optical energy and transmitting the same through media according to claim 15 wherein said uniaxial medium is provided with a third boundary which is parallel to said limited angular aperture arbitrarily polarized beam impinging upon said entrance boundary.

18. A system for polarizing optical energy and transmitting the same through media according to claim 12 wherein said limited angular aperture arbitrarily polarized beam impinges normally on said entrance boundary of said uniaxial medium.

19. A two-stage prism system for polarizing optical energy and transmitting the same through media comprising a first prism having an entrance boundary and an exit boundary, a second prism being provided with an entrance surface and an exit surface, at least said first prism being composed of a uniaxial medium, said first and second prisms being surrounded by an isotropic medium, a limited angular aperture arbitrarily polarized beam having a principal ray adapted to enter said two-stage prism system, said principal ray having ordinary ray and extraordinary ray components, said first and second prisms adapted to be oriented in spaced relation with respect to each other to provide a minimum reflection loss transmission of said extraordinary ray therethrough and the total reflection of said ordinary ray, the transmission of said extraordinary ray through a boundary of said at least one uniaxial medium being at the Brewster angle for said extraordinary ray and associated uniaxial medium and said surrounding isotropic medium.

20. A two-stage prism system for polarizing optical energy and transmitting the same through media according to claim 19 wherein said second prism is provided with one boundary positioned to receive a transmitted extraordinary ray at the Brewster angle with respect thereto.

21. A two-stage prism system for polarizing optical energy and transmitting the same through media according to claim 20 wherein said limited angular aperture arbitrarily polarized beam impinges upon said entrance boundary of said first prism, the optic axis of said first prism being parallel to said entrance surface, said exit boundary of said first prism being disposed at such angle with respect to said entrance boundary as to totally reflect said ordinary ray and to transmit said extraordinary ray therethrough at minimal reflection loss.

22. A two-stage prism system for polarizing optical energy and transmitting the same through media according to claim 21 wherein said first prism and said second prism are in spaced relation and separated by a uniform air gap.

23. A two-stage prism system for polarizing optical energy and transmitting the same through media according to claim 22 wherein said first prism in said two-stage prism system physically receives the light energy before the second stage.

24. A two-stage prism system for polarizing optical energy and transmitting the same through media according to claim 23 wherein said second prism is composed of an isotropic medium, different from said surrounding medium.

25. A two-stage prism system for polarizing optical energy and transmitting the same through media according to claim 24 wherein said isotropic medium is glass.

26. A two-stage prism system for polarizing optical energy and transmitting the same through media according to claim 25 wherein said isotropic material is glass of the SF6 type.

27. A two-stage prism system for polarizing optical energy and transmitting the same through media according to claim 26 wherein said glass is the SF18 type.

28. A two-stage prism system for polarizing optical energy and transmitting the same through media according to claim 27 wherein said glass is the LASF 1 type.

29. A two-stage prism system for polarizing optical energy and transmitting the same through media according to claim 25 wherein said entrance surface of said glass second prism receives said transmitted extraordinary ray at the Brewster angle for said glass second prism, said extraordinary ray emerging from said exit surface of said second prism and disposal with respect to said second prism such that said extraordinary ray emerges from said exit surface parallel to the limited angular aperture arbitrarily polarized beam entering said entrance boundary of said first prism.

30. A two-stage prism system for polarizing optical energy and transmitting the same through media according to claim 22 wherein said second prism is composed of a uniaxial medium identical in form to said first uniaxial prism, the optic axis of said second prism being parallel to said exit surface thereof such that said exit surface of said second prism is parallel to the entrance boundary of said first prism resulting in the emergence of said transmitted extraordinary ray of Brewster angle with respect to said exit surface of said second prism and parallel to the limited angular aperture arbitrarily polarized beam impinging upon said entrance boundary of said first prism.

31. A two-stage prism system for polarizing optical energy and transmitting the same through media according to claim 30 wherein said first prism is composed of a uniaxial medium such as calcite having an apex angle in the range of 67° 27' to 66° 55' for total reflection of the ordinary ray at the exit boundary.

32. A two-stage prism system for polarizing optical energy and transmitting the same through media comprising a first prism having an entrance boundary and exit boundary, a second prism being provided with an entrance surface and an exit surface, at least said first prism being composed of an uniaxial medium, said first and second prism being surrounded by an isotropic medium, a limited angular aperture arbitrarily polarized beam having a principal ray adapted to enter said two-stage prism system, said principal ray having an ordinary ray and an extraordinary ray as components thereof, said first and second prisms being separated by a limited spaced air gap, said air gap being non-uniformly spaced so that varying media for use as said first and second prisms may obtain Brewster angle transaction.

33. A two-stage prism system for polarizing optical energy and transmitting the same through media according to claim 21 wherein said second prism is the first to receive said optical energy.

34. A two-stage prism system for polarizing optical energy and transmitting the same through media according to claim 33 wherein said second prism is composed of an isotropic medium.

35. A two-stage prism system for polarizing optical energy and transmitting the same through media according to claim 34 wherein said isotropic medium is glass.

36. A two-stage prism system for polarizing optical energy and transmitting the same through media according to claim 35 wherein said exit surface of said glass second prism receives said limited angular aperture arbitrarily polarized beam at the Brewster angle for said glass second prism, said entrance of said second glass stage being disposed at an angle with respect to said exit surface of said second stage such that said limited angular aperture arbitrarily polarized beam impinges on said entrance boundary of said second glass stage parallel to the limited angular aperture arbitrarily polarized beam emerging from said exit boundary of said first uniaxial stage.

37. A two-stage prism system for polarizing optical energy and transmitting the same through media according to claim 36 wherein said first and second prisms are in spaced relation and separated by a non-uniform air gap so that the space in the tilted air gap is varied in accordance with the index of refraction of the glass second stage in order to maintain Brewster's angle at the air gap.

38. A two-stage prism system for polarizing optical energy and transmitting the same through media according to claim 23 wherein the entrance surface of said second glass prism is antireflection coated.

39. A two-stage prism system for polarizing optical energy and transmitting the same through media according to claim 32 wherein said prisms are in closed spaced relationship and a tilted air gap is created so that Brewster's angle at one or more of the surfaces creates an emergent beam from the second stage parallel to the incoming beam to the first stage.

40. A two-stage prism system for polarizing optical energy and transmitting the same through media according to claim 39 wherein the tilt is less than 10° and wherein one of the stages is a uniaxial medium and the other stage is an isotropic medium.

* * * * *